(12) United States Patent
Putnam

(10) Patent No.: US 12,405,185 B2
(45) Date of Patent: Sep. 2, 2025

(54) LEAK-AND-SEALING-FAILURE-DETECTION SENSOR AND SYSTEM

(71) Applicant: David Putnam, Sammamish, WA (US)

(72) Inventor: David Putnam, Sammamish, WA (US)

(*) Notice: Subject to any disclaimer, the term of this patent is extended or adjusted under 35 U.S.C. 154(b) by 326 days.

(21) Appl. No.: 18/115,243

(22) Filed: Feb. 28, 2023

(65) Prior Publication Data

US 2023/0273088 A1 Aug. 31, 2023

Related U.S. Application Data

(60) Provisional application No. 63/314,999, filed on Feb. 28, 2022.

(51) Int. Cl.
*G01M 3/20* (2006.01)
*G01M 3/38* (2006.01)
*G06T 7/00* (2017.01)

(52) U.S. Cl.
CPC .............. *G01M 3/38* (2013.01); *G06T 7/0002* (2013.01); *G06T 2207/10024* (2013.01)

(58) Field of Classification Search
CPC ............ G01M 3/00; G01M 3/20; G01M 3/38; G01N 33/00; G06T 7/00; G06T 7/0002; G06T 2207/10024
See application file for complete search history.

(56) References Cited

U.S. PATENT DOCUMENTS

| | | | |
|---|---|---|---|
| 7,749,768 B2 * | 7/2010 | Havens | G01N 21/6408 436/127 |
| 9,046,437 B2 * | 6/2015 | Miller | G01M 3/04 |
| 9,274,060 B1 * | 3/2016 | Ascheman | G01N 21/6408 |
| 9,500,593 B2 * | 11/2016 | Harris | G01N 21/78 |
| 2003/0008400 A1 * | 1/2003 | Putnam | G01N 31/225 422/417 |
| 2005/0053518 A1 | 3/2005 | Putnam et al. | |
| 2006/0121613 A1 | 6/2006 | Havens | |
| 2015/0317787 A1 * | 11/2015 | Badawy | G06T 7/90 382/152 |

FOREIGN PATENT DOCUMENTS

WO 9720213 A1 6/1997

* cited by examiner

*Primary Examiner* — Nguyen Q. Ha
(74) *Attorney, Agent, or Firm* — OPWII, LLC

(57) ABSTRACT

The current document is directed to a leak-and-sealing-failure-detection sensor and a leak-detection system that incorporates the leak-and-sealing-failure sensor to detect leaks and sealing failures in a variety of different containers, packages, and products. The leak-and-sealing-failure-detection sensor produces a response signal when the leak-and-sealing-failure-detection sensor detects a difference between a local environment associated with the leak-and-sealing-failure-detection sensor and the environment external to the leak-and-sealing-failure-detection sensor and the container, package, and/or product to which the leak-and-sealing-failure-detection sensor is applied.

20 Claims, 17 Drawing Sheets

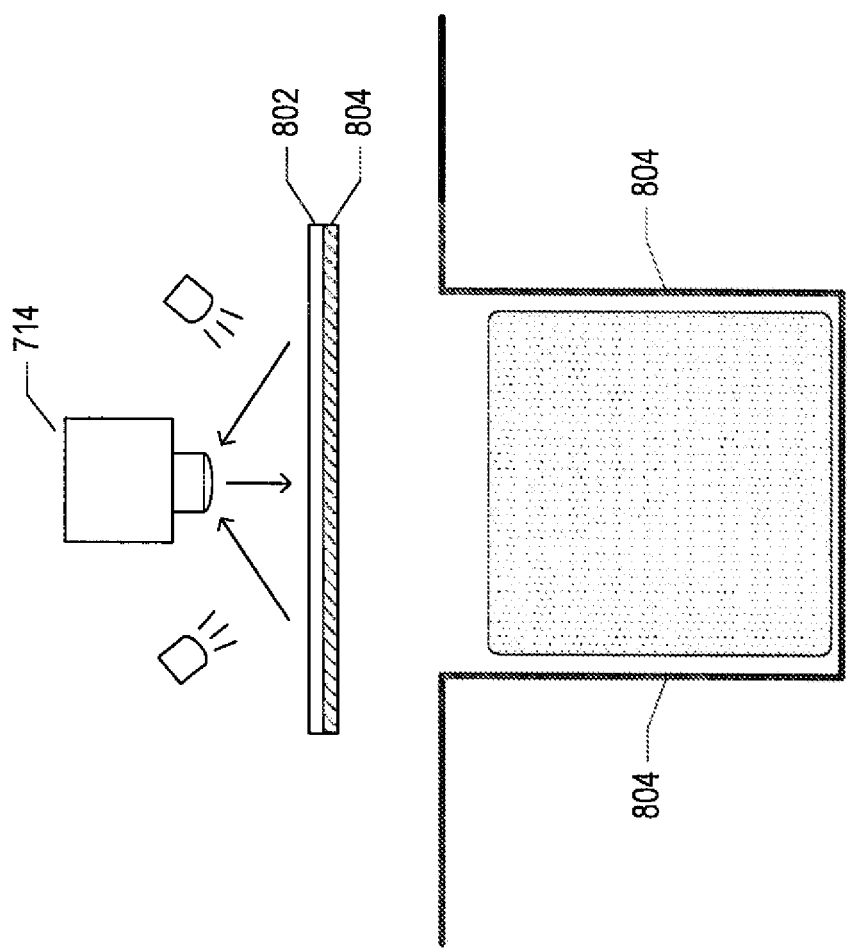

LEAK-AND-SEALING-FAILURE-DETECTION SENSOR AND SYSTEM

CROSS REFERENCE TO RELATED APPLICATION

This application claims the benefit of Provisional Application No. 63/314,999, filed Feb. 28, 2022.

TECHNICAL FIELD

The current document is directed to methods and systems for detecting leaks, sealing failures, and other container failures and defects and, in particular, to a leak-detection system that incorporates a leak-detection sensor that produces a response signal.

BACKGROUND

Many different types of sealed containers are used for packaging, shipping, and retailing products. For food and beverage products, air-tight seals are necessary to protect the contents of sealed containers from oxidation, contamination from bacteria and other microorganisms, leakage, and other such problems. When sealing fails in containers for various types of manufactured products, introduction of water vapor and other contaminants from the external environment can lead to discoloration and to surface and structural degradation. However, it is currently very difficult to detect failed seals in packaging, including packaging that is filled and sealed by mechanical packaging equipment and facilities. In addition, many types of products rely on maintaining internal, enclosed environments isolated from their external environments, using various types of gas and fluid barriers. Even tiny pin-hole-sized leaks can result in contamination and damage, but there are few, if any, currently available methods for detecting small leaks and sealing failures in containers, packages, and products that are widely applicable to different types of containers, packages, and products, cost-effective, sufficiently rapid for use in high-throughput packaging lines, and sufficiently responsive to small, low-volume leaks.

SUMMARY

The current document is directed to a leak-and-sealing-failure-detection sensor and a leak-detection system that incorporates the leak-and-sealing-failure sensor to detect leaks and sealing failures in a variety of different containers, packages, and products. The leak-and-sealing-failure-detection sensor produces a response signal when the leak-and-sealing-failure-detection sensor detects a difference between a local environment associated with the leak-and-sealing-failure-detection sensor and the environment external to the leak-and-sealing-failure-detection sensor and the container, package, and/or product to which the leak-and-sealing-failure-detection sensor is applied. The leak-detection system that incorporates the leak-and-sealing-failure sensor includes an interrogation component that initiates the sensor response and a monitoring component that detects the response signal and initiates generation of an indication, alarm, and/or an automated, semi-automated, or manual response to detection of a leak or sealing failure.

BRIEF DESCRIPTION OF THE DRAWINGS

FIGS. 8A-B illustrate a second implementation of the leak-detection system that incorporates an implementation of the currently disclosed leak-and-sealing-failure-detection sensor.

DETAILED DESCRIPTION

Figure 1:
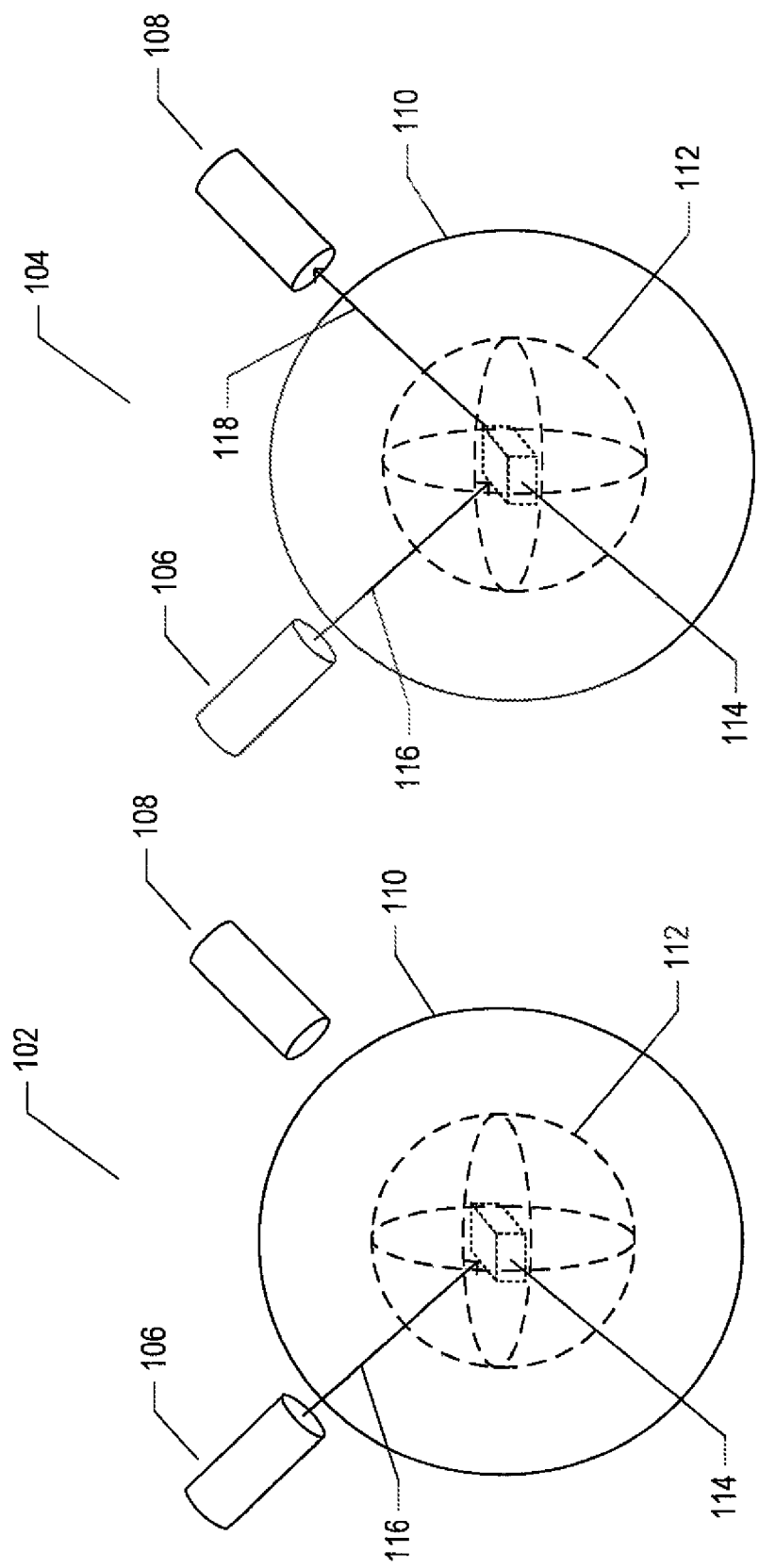
FIG. 1 illustrates an operational principle of the currently disclosed and currently claimed leak-and-sealing-failure-detection sensor.

Concise Description of the Currently Disclosed and Currently Claimed Leak-And-Sealing-Failure-Detection Sensor FIG. 1 illustrates an operational principle of the currently disclosed and currently claimed leak-and-sealing-failure-detection sensor. The left-hand portion 102 of FIG. 1 indicates a non-sensing state of the leak-and-sealing-failure-detection sensor and the right-hand portion 104 of FIG. 1 illustrates a sensing state of the leak-and-sealing-failure-detection sensor. Each portion of FIG. 1, next described with respect to the left-hand portion 102 of FIG. 1, shows an interrogation component 106 and a monitoring component 108 of a leak-detection system that incorporates the currently disclosed leak-and-sealing-failure-detection sensor, a large spherical volume representing the general environment 110, an inner spherical volume 112 that represents a local environment surrounding a portion of the leak-and-sealing-failure-detection sensor, and the portion 114 of the leak-and-sealing-failure-detection sensor. When the general environment is identical or similar to the local environment, as indicated in the left-hand portion 102 of FIG. 1 by uniform shading within both the large sphere 110 and the inner sphere 112, and when the interrogation component 106 generates an interrogation signal, represented by arrow 116, the portion 114 of the leak-and-sealing-failure-detection sensor does not produce a response signal. By contrast, when the general environment is different from the local environment, as indicated in the right-hand portion 104 of FIG. 1 by shading within the large sphere 110 and no shading within the inner sphere 112, and when the interrogation component 106 generates an interrogation signal, represented by arrow 116, the portion 114 of the leak-and-sealing-failure-detection sensor produces a response signal. The phrase "response signal" refers to a signal of sufficient intensity, represented by arrow 118, to be detected by the monitoring component 108 and that measurably differs from any background signals that are produced by the portion of the leak-and-sealing-failure-detection sensor when the general environment is identical or similar to the local environment. The response signal indicates a leak or sealing failure. Thus, the portion of the leak-and-sealing-failure-detection sensor 114 directly detects a difference between the general environment and the local environment and generates a response signal when such a difference is detected. In one of the disclosed implementations, the portion of the leak-and-sealing-failure-detection sensor emits a low-intensity background photoluminescence with a relatively short emission-decay half life when the [O2] in the local environment is identical or similar to the [O2] in the general environment and emits a photoluminescence with an intensity greater than a threshold intensity that is greater than that of the low-intensity background photoluminescence and with an emission-decay half life greater than a threshold emission-decay half life that is greater than the relatively short emission-decay half life when the [O2] in the local environment is not identical or similar to the [O2] in the general environment. In this case, the response signal is measurably different from the background signal. In other implementations, the portion of the leak-and-sealing-failure-detection sensor may emit a response signal when the general environment is identical or similar to the local environment and may not emit a response signal when the general environment differs from the local environment.

In certain implementations of the currently claimed leak-and-sealing-failure-detection sensor discussed below, the general environment is the ambient air within the environment external to the sensor and a container, package, and/or product to which the leak-and-sealing-failure-detection sensor is applied. The local environment is the air surrounding a portion of the leak-and-sealing-failure-detection sensor which has been altered due to a leak or sealing failure in the container, package, and/or product. In the implementations discussed below, a detectable difference between the ambient air in the general environment and the air surrounding the portion of the leak-and-sealing-failure-detection sensor is a decreased diatomic-oxygen, $O_2$, concentration, $[O_2]$, in the local environment of the portion of the leak-and-sealing-failure-detection sensor, with respect to the diatomic-oxygen concentration, $[O_2]$, in the ambient air in the general environment. However, alternative implementations of the currently claimed leak-and-sealing-failure-detection sensor that exhibit sufficient responsiveness to any other difference in the chemical components of the general environment produced in the local environment of a sensor portion by a leak or sealing failure in the container, package, and/or product to which the leak-and-sealing-failure-detection sensor is applied can be alternatively used for leak and sealing-failure detection. Gas concentrations may be indicated as partial pressures, moles of gas per volume of gas at standard pressures and temperatures, or by other such units-associated numeric values. Furthermore, while, in the implementations discussed below, both the general environment and the local environment are gaseous, alternative implementations of the currently disclosed and claimed leak-and-sealing-failure-detection sensor can be used when the general environment and local environment are liquids or when one environment is liquid and the other environment is gaseous.

Figure 2:
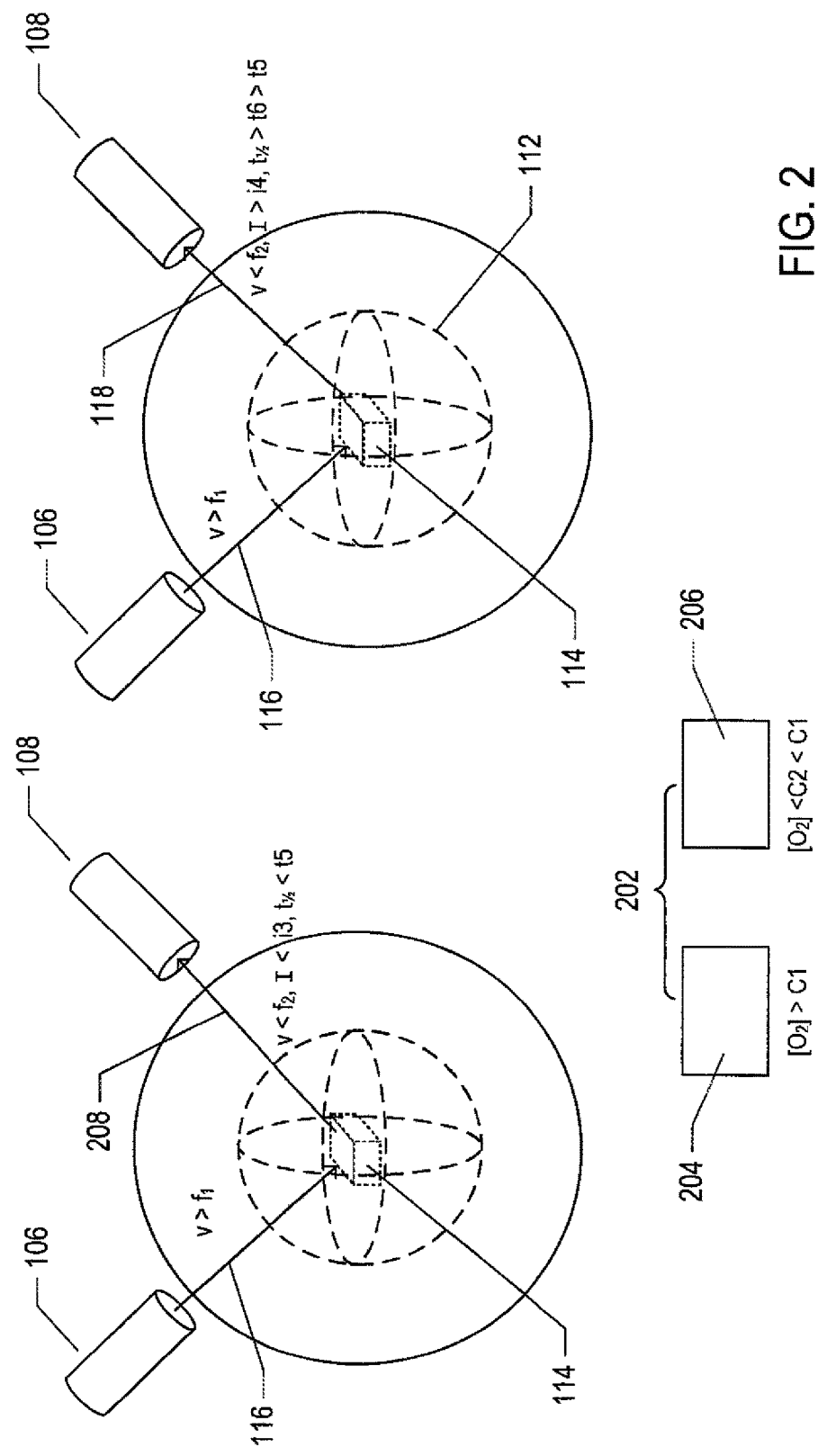
FIG. 2 illustrates, using the same illustration conventions used in FIG. 1, characteristics of certain components of a leak-detection system, the currently disclosed leak-and-sealing-failure-detection sensor, and the general and local environments discussed above with reference to FIG. 1.

FIG. 2 illustrates, using the same illustration conventions used in FIG. 1, characteristics of certain components of a leak-detection system, the currently disclosed leak-and-sealing-failure-detection sensor, and the general and local environments discussed above with reference to FIG. 1. As indicated by a key 202 at the bottom of FIG. 2, shading 204 indicates a diatomic-oxygen concentration greater than a first threshold concentration c1 while a lack of shading 206 indicates a diatomic-oxygen concentration less than a second threshold concentration c2. The interrogation component 106 emits light 116 of a frequency greater than a first threshold frequency $f_1$. In disclosed implementations, below, the first threshold frequency $f_1$ is in the frequency range for blue or ultraviolet light. The monitoring component 108 is an optical sensor, such as a charge-coupled device ("CCD") or complementary metal-oxide-semiconductor ("CMOS") image sensor. The portion of the leak-and-sealing-failure-detection sensor, when illuminated by the interrogation component, absorbs a portion of the relatively high-frequency light emitted by the interrogation component and then emits, in response, light 118 and 208 of a lower frequency than $f_1$ that is less than a second frequency threshold f2. In the implementations discussed below, the second frequency threshold lies within or above the frequency range for red and infrared light. When the general environment and local environments are identical or similar, the intensity I of the light 208 emitted by the portion 114 of the leak-and-sealing-failure-detection sensor is less than a first intensity threshold i3 and has an emission-intensity decay half-life of less than a first emission-intensity-decay-half-life threshold t5. When the general environment and local environments are different, the intensity I of the response signal 118 emitted by the portion 114 of the leak-and-sealing-failure-detection sensor is greater than a second intensity threshold i4 and has an emission-intensity decay half-life of greater than a second emission-intensity-decay-half-life threshold t6. The emission-intensity half-life can be understood from equations 210 at the top of FIG. 2. The rate of decrease in emission intensity is equal to a constant λ times the current intensity I, as indicated in equation 212. Rearrangement of equation 212 and integration of both sides of the rearranged equation produces equation 214, which shows that the current emission intensity $I_t$ is equal to an initial emission intensity $I_0$ times $e^{-\lambda \cdot t}$ and which is the classical equation for exponential decay. The time that elapses following an initial time when the portion of the leak-and-sealing-failure-detection sensor is emitting light of a frequency less than the first intensity threshold i3 at an intensity $I_0$ and illumination from the interrogation component is terminated until a subsequent time $t_{1/2}$ when the current intensity is one half the initial intensity $I_0$ is referred to as the emission-intensity-decay half-life. Equation 216 provides an expression for the emission-intensity-decay half-life. Emission of light from the portion of the leak-and-sealing-failure-detection sensor decays over an increasingly longer period of time as the $O_2$ concentration in the local environment decreases.

Figure 3:
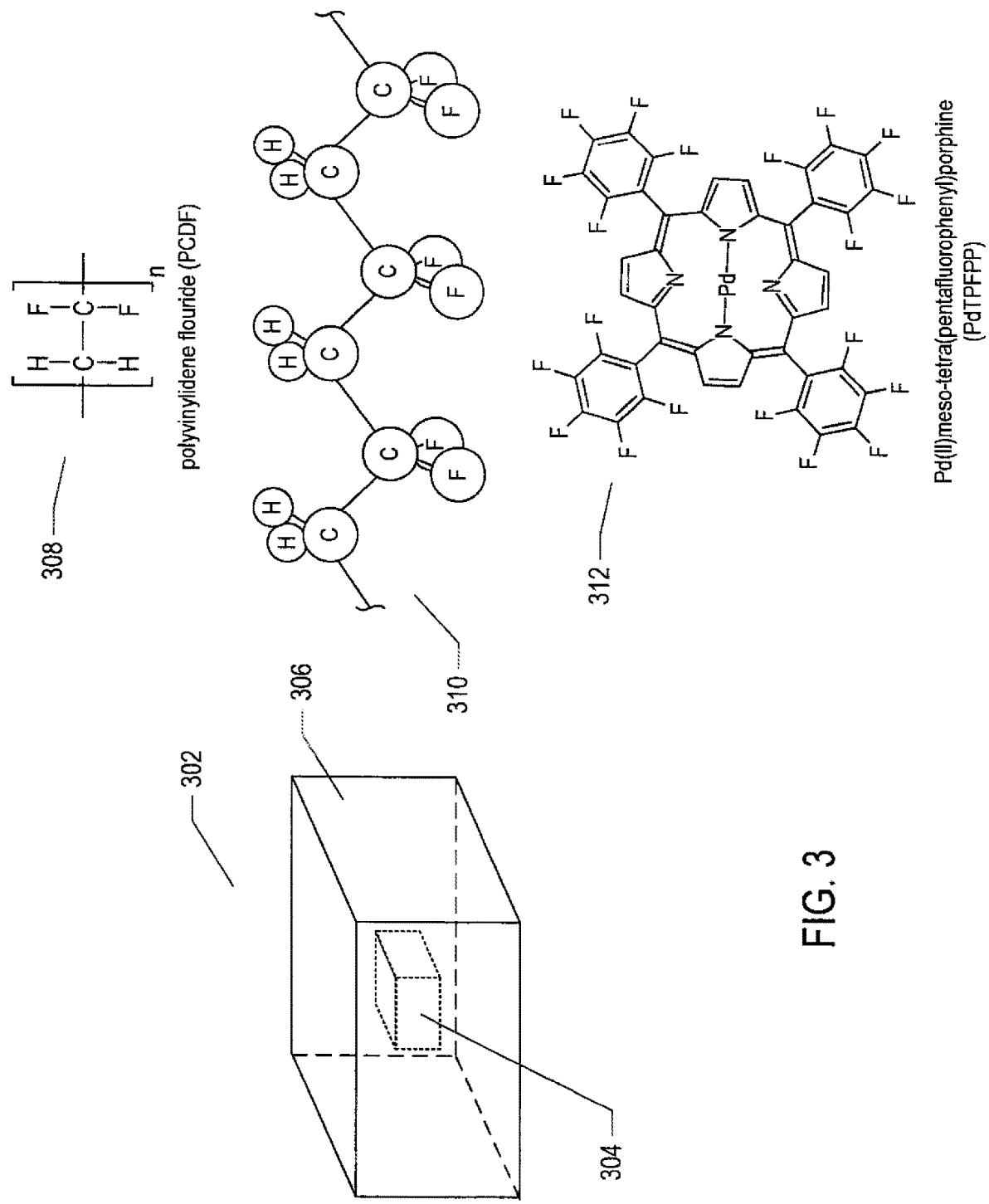
FIG. 3 illustrates one general implementation of the currently claimed leak-and-sealing-failure-detection sensor.

FIG. 3 illustrates one general implementation of the currently claimed leak-and-sealing-failure-detection sensor. The general implementation of the currently claimed leak-and-sealing-failure-detection sensor 302 includes a sensor portion 304 within an additional non-sensing portion 306. In certain specific implementations, the leak-and-sealing-failure-detection sensor includes only a sensing portion. In other specific implementations, the leak-and-sealing-failure-detection sensor includes a non-sensing layer above or below a sensing layer. In still other specific implementations, the leak-and-sealing-failure-detection sensor includes non-sensing layers both above and below a sensing layer. Other implementations include a non-sensing material that encapsulates one or more sensing portions or layers. In certain implementations in which the leak-and-sealing-failure-detection sensor includes only a sensing portion, the sensing portion may be a liquid solution or mixture that can be applied to a container, package, and/or product in order to form an integral leak-and-sealing-failure-detection sensor that detects leaks and sealing failures. In one implementation, discussed in greater detail, below, the sensing portion 304 is composed of a polyvinylidene fluoride ("PVDF") polymer. The structural formula 308 shows the two-carbon repeating unit within PVDF and the ball-and-stick depiction 310 shows a six-carbon portion of a longer PVDF polymer chain. The PVDF sensing portion is impregnated with an optical-reporter component. One example of a suitable optical-reporter component for a leak-and-sealing-failure-detection sensor is Pd(II) meso-tetra(pentafluorophenyl) porphine "PdTPFPP"), illustrated by structural formula 312. This is a palladium-coordinating fluoro-substituted porphyrin in a class of palladium-coordinating substituted porphyrins that absorb blue or ultraviolet light and that emit lower-frequency red or infrared light. However, the intensity of light emission by these palladium-coordinating substituted porphyrins is quite sensitive to the concentration of diatomic oxygen, [$O_2$], as discussed below. Thus, a PVDF film or membrane impregnated with PdTPFPP provides a red-light response signal in response to illumination by a UV-emitting interrogation component when a local environment associated with the PVDF film impregnated with PdTPFPP has a diatomic-oxygen concentration lower than that of the general environment and thus represents one implementation of the leak-and-sealing-failure-detection sensor discussed above with reference to FIGS. 1 and 2. However, there are many additional compounds that provide similar responses to illumination, including additional palladium-coordinating substituted porphyrins, such as Pd(II) octaethylporphine. Moreover, there are a large number of different types of reporter molecules that can be employed in leak-and-sealing-failure-detection sensors that respond to environmental changes other than diatomic-oxygen concentration, including reporter molecules that emit additional types of signals in response to different types of interrogation signals.

Figure 4:
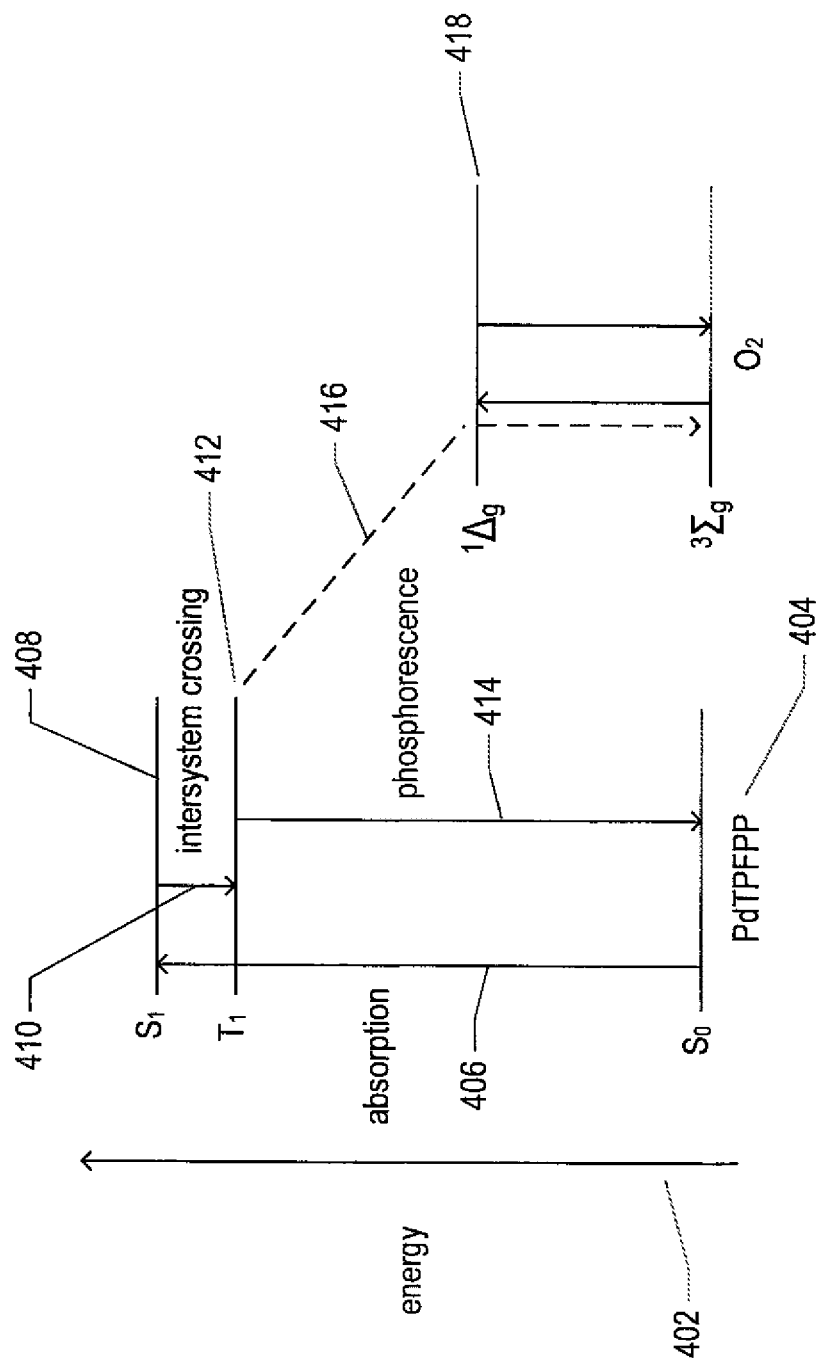
FIG. 4 illustrates light absorption and light emission by PdTPFPP and light-emission quenching by diatomic oxygen.

FIG. 4 illustrates light absorption and light emission by PdTPFPP and light-emission quenching by diatomic oxygen. As indicated by arrow 402, the plots in FIG. 4 are related to energy levels, with energy increasing in the vertical direction. The ground-state energy of PdTPFPP is represented by horizontal line segment 404. Absorption by PdTPFPP of a photon of ultraviolet light can result in transition, represented by arrow 406, to an excited singlet state with an energy level represented by horizontal line segment 408. Non-radiative intersystem crossing, represented by arrow 410, results in a transition from the excited singlet state to an excited triplet state with an energy level represented by horizontal line segment 412. The PdTPFPP can transition from the excited triplet state back to the ground state 404, represented by arrow 414, and emits a photon of red light as a result of this transition, but the probability of this transition is quite low, as a result of which there may be a significant time lag between the initial absorption of a photon of ultraviolet light 406 and emission of a red-light photon 414. This time delay is what is referred to by the phrase "phosphorescence." Another type of optical sensor signal is fluorescent light emission, which occurs as a result of a transition from the excited singlet state of the reporter molecule to the ground state, where the probability of that transition is much higher and the delay between absorption and emission correspondingly much shorter. While the PdTPFPP is in the excited triplet state, collision of the PdTPFPP with a diatomic-oxygen molecule can provide a second path 416 by which the PdTPFPP can lose energy and revert to the ground state. A portion of the excited-triplet-state energy is transferred, during the collision, to the diatomic-oxygen molecule, exciting the diatomic-oxygen molecule from the ground state to an excited singlet state represented by horizontal line segment 418. Transition of the diatomic-oxygen molecule from the excited singlet state back to the ground state is accompanied by emission of a much lower-frequency photon, generally outside the range of detection of the monitoring component (108 in FIGS. 1 and 2). The alternative second path 416 by which the PdTPFPP loses energy and reverts to the ground state is referred to as "quenching," and is extremely sensitive to the concentration of diatomic oxygen, [$O_2$], to which the PdTPFPP is exposed.

Figure 5:
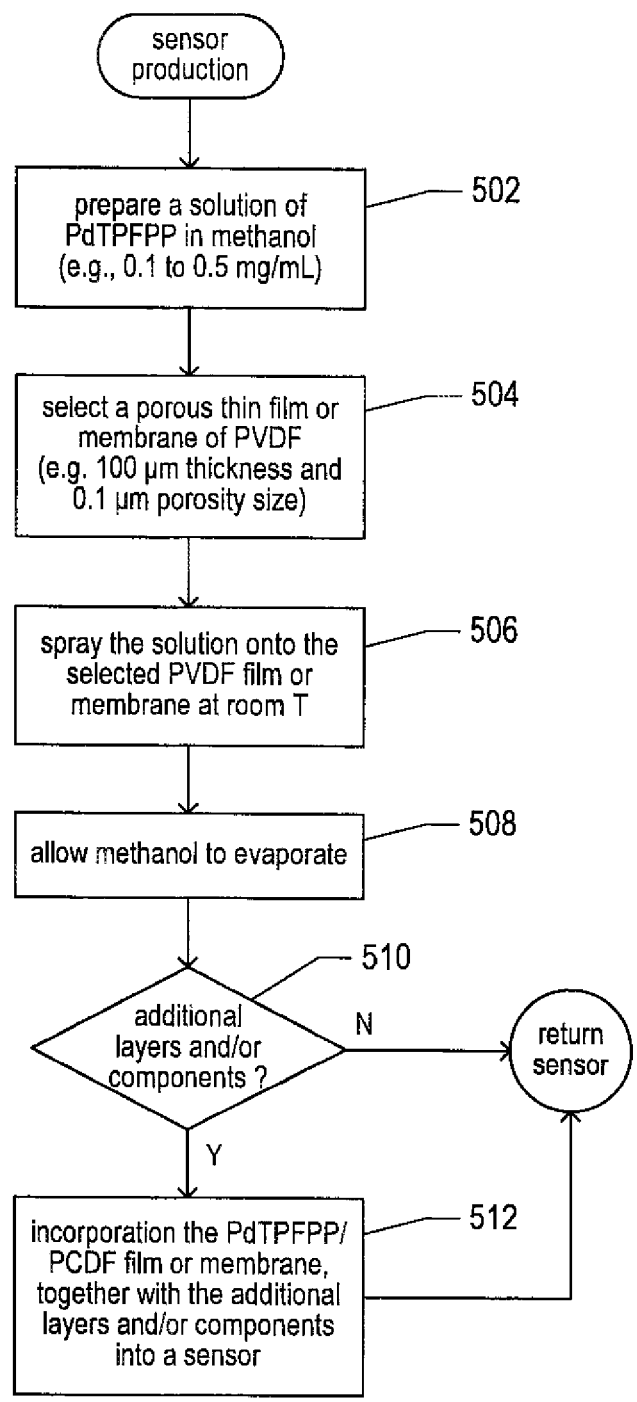
FIG. 5 provides a control-flow diagram that illustrates a method for preparing a leak-and-sealing-failure-detection sensor that represents one implementation of the currently disclosed leak-and-sealing-failure-detection sensor.

FIG. 5 provides a control-flow diagram that illustrates a method for preparing a leak-and-sealing-failure-detection sensor that represents one implementation of the currently disclosed leak-and-sealing-failure-detection sensor. In step 502, a solution of PdTPFPP in methanol is prepared. In certain implementations, the solution includes 0.1 to 0.5 milligrams of PdTPFPP per milliliter of methanol. Next, in step 504, a porous thin film or membrane of PVDF is selected and prepared for PdTPFPP impregnation. In certain implementations, the PVDF film or membrane has a thickness of about 100 μm and a porosity size of 0.1 μm. In step 506, the PVDF film or membrane is sprayed with the solution prepared in step 502 at or near room temperature. In one implementation, a Badger air brush is used for spraying the solution onto the PVDF film or membrane. In step 508, the methanol is allowed to evaporate. This process results in a portion of the PdTPFPP being carried, by the methanol, into the interior of the PVDF film or membrane, where the PdTPFPP is shielded, to a measurable extent, from the ambient air. The volume of the solution sprayed per cubic meter of the PVDF film or membrane may be varied to vary the amount of PdTPFPP incorporated into the PVDF film or membrane as well as to vary the distribution of PdTPFPP within the PVDF film or membrane. When the leak-and-sealing-failure-detection sensor produced by the method includes additional layers and/or components, as determined in step 510, the PdTPFPP-impregnated PVDF film or membrane is assembled along with the additional layers and/or components, in step 512, to produce the final leak-and-sealing-failure-detection sensor. As mentioned above, alternative leak-and-sealing-failure-detection sensors may be produced in liquid form for application to a container, package, and/or product. In other implementations, the PdTPFPP may be incorporated into another type of medium or matrix, rather than a PVDF film or membrane. In still other implementations, the incorporation of PdTPFPP into the PVDF film or membrane or another type of medium or matrix may be spatially nonuniform so that, when the leak-and-sealing-failure-detection sensor is illuminated in a low-oxygen environment, the phosphorescent emission occurs from discrete points within the PVDF film or membrane or other type of medium or matrix. Emission from a two-dimensional or three-dimensional grid of discrete emission points may facilitate quantitative determination of the volume of gas or fluid leaking from a container, package, or product to which the leak-and-sealing-failure-detection sensor is applied.

Examples of the additional layers and/or components that may be incorporated into an implementation of the currently disclosed leak-and-sealing-failure-detection sensor are discussed below. In general, these may include structural layers or components to increase the resilience of the sensing portion of the leak-and-sealing-failure-detection sensor to mechanical wear and abrasion, gas or fluid barriers to isolate or shield the sensing portion of the leak-and-sealing-failure-detection sensor from exposure to the general environment, and other types of layers are components that may enhance functionalities of the leak-and-sealing-failure-detection sensor, such as light filters and layers that enhance the light emitted by the leak-and-sealing-failure-detection sensor. In other types of leak-and-sealing-failure-detection sensors, the leak-and-sealing-failure-detection sensors may respond to other types of interrogation signals or may be self-interrogating by containing additional components, such as radionuclides, and may produce different types of emitted signals detected by different types of monitoring components. Similarly, all or a portion of the monitoring component could be included within the sensor substrate or in additional layers. The additional layers and/or components may be either passive or active layers and components. For example, a barrier layer may exhibit nonuniform isolation or shielding properties, or may respond to external inputs by varying the isolation or shielding properties exhibited by the barrier layer. As mentioned above, one defining characteristic of the currently disclosed leak-and-sealing-failure-detection sensors is that they emit signals that can be detected and interpreted as indicating whether or not the local environment of the signal-emitting portions of the leak-and-sealing-failure-detection sensors is identical or similar to the general environment or different from the general environment, where the detected differences of the local environment from the general environment result from leakage or sealing failures of the containers, packages, and/or products to which the leak-and-sealing-failure-detection sensors are applied.

Figure 6:
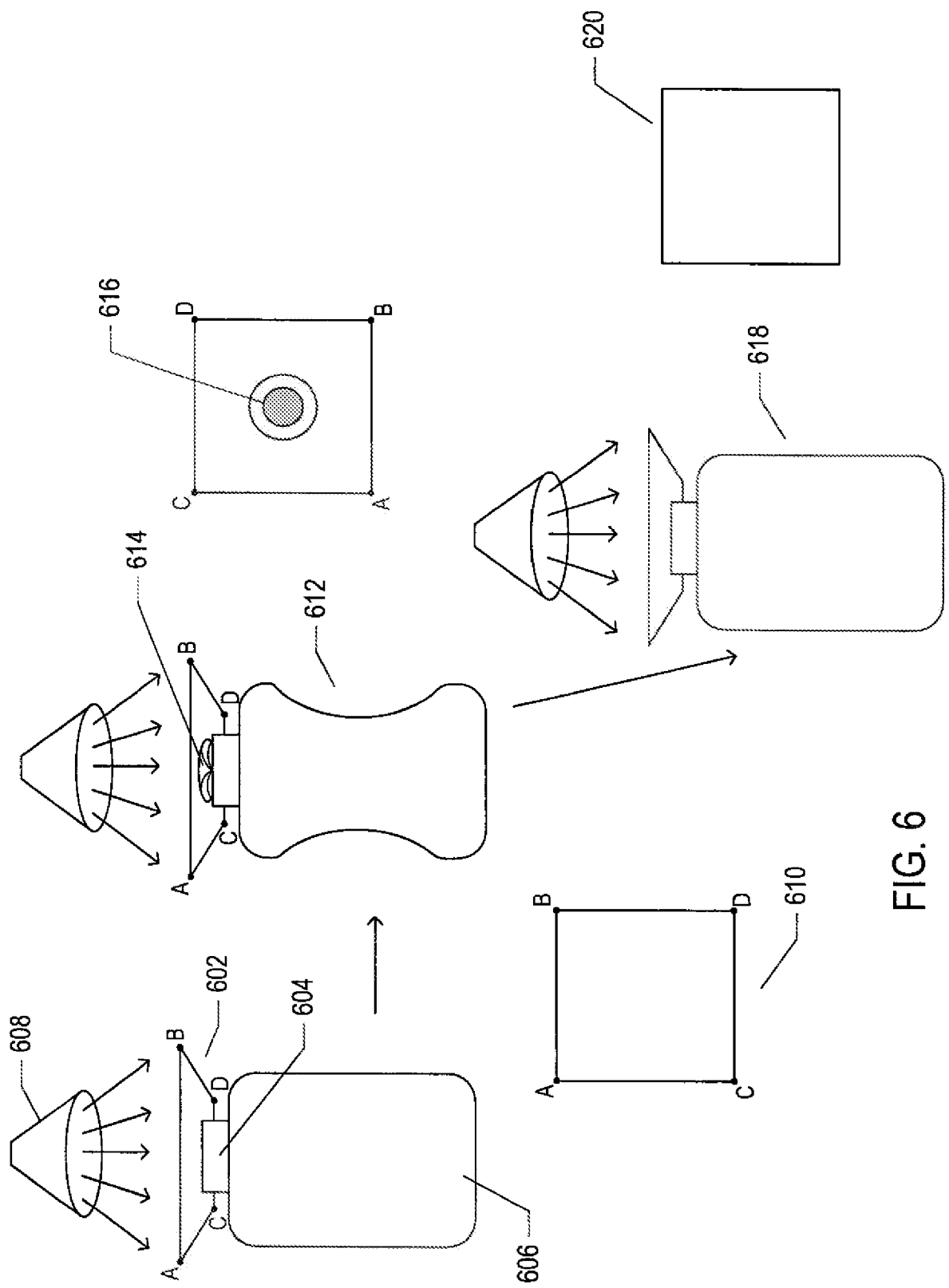
FIG. 6 illustrates one generalized application of the currently disclosed leak-and-sealing-failure-detection sensor.

FIG. 6 illustrates one generalized application of the currently disclosed leak-and-sealing-failure-detection sensor. For this application, a leak-and-sealing-failure-detection-sensor film or plate 602 is placed in proximity to the top surface of the cap 604 that seals a plastic bottle 606. The leak-and-sealing-failure-detection-sensor film or plate 602 is illuminated by an ultraviolet-light source 608 and is visually monitored by a human. Initially, a visual inspection of the illuminated leak-and-sealing-failure-detection-sensor film or plate 602, shown as it would appear to a human monitor 610 looking down in the direction of illumination by the interrogation monitor, reveals no emitted signal from the leak-and-sealing-failure-detection-sensor film or plate 602. However, when the bottle is squeezed 612, low-oxygen gas from the interior of the bottle escapes from a tiny hole in the cap and exposes an area 614 of the underside of the leak-and-sealing-failure-detection-sensor film or plate 602 to the low-oxygen gas escaping from the bottle. As a result, quenching of the reporter molecules within the low-oxygen local environment is greatly diminished, resulting in phosphorescent emission by the reporter molecules that appears as a red, illuminated spot 616 in the leak-and-sealing-failure-detection-sensor film or plate 602 when viewed from above. When the bottle is no longer squeezed 618, the low-oxygen local environment dissipates, leading to renewed, uniform quenching of the reporter molecules within the leak-and-sealing-failure-detection-sensor film or plate 602 and to the disappearance of the red, illuminated spot from the leak-and-sealing-failure-detection-sensor film or plate 620. Of course, in alternative implementations, the leak-and-sealing-failure-detection-sensor film or plate can be monitored by an optical detector connected to a computer system in order to detect the signals emitted from reporter molecules in temporary low-oxygen environments within the leak-and-sealing-failure-detection-sensor film or plate. Monitoring-component detection can be based on measuring the intensity of emitted red light, on detecting and determining the emission-intensity-decay half-life of the leak-and-sealing-failure-detection-sensor film or plate when the interrogation component is powered off or masked, or on both.

In certain implementations, the currently disclosed leak-and-sealing-failure-detection sensor can be incorporated directly into a container, package, or product or positioned within a container, package, or product. Thus, the currently disclosed leak-and-sealing-failure-detection sensor may be temporarily applied to a container during a leak-detection process or may be incorporated in or within a container to be available for leak detection over relatively long periods of time.

While there are many different types of specific sensors and systems for detecting specific types of failures, the currently disclosed leak-and-sealing-failure-detection sensor and leak-detection systems that incorporate or employ the currently disclosed leak-and-sealing-failure-detection sensor are more generically applicable to leak-detection and sealing-failure detection problem domains. The currently disclosed leak-and-sealing-failure-detection sensor does not detect particular substances leaking from a container, but instead detects differences between the concentrations and/or other states and characteristics of chemical substances in the general environment, such as ambient air, and the concentrations or other states and characteristics of those same chemical substances in temporary local environments associated with the leak-and-sealing-failure-detection sensor generated by container leaks. Thus, a specialized leak-detection sensor might, for example, detect the presence of ethyl alcohol outside a container containing ethyl alcohol, which would be effective for detecting leaks from containers containing ethyl alcohol, but which would not be effective for detecting leaks from containers containing toluene or propane. By contrast, given that containers containing ethyl alcohol, toluene, or propane would all have internal environments with lower $O_2$ concentrations than the $O_2$ concentration in ambient air, the currently disclosed leak-and-sealing-failure-detection sensor and leak-detection systems that incorporate or employ the currently disclosed leak-and-sealing-failure-detection sensor can detect leaks from all three of these containers, since the currently disclosed leak-and-sealing-failure-detection sensor detects a change, in temporary local environments, in the concentrations and/or other states and characteristics of the chemical components of the general environment. The currently disclosed leak-and-sealing-failure-detection sensor is an approach that is far less specific than detecting the presence of particular chemical components within the container that diffuse into the general environment external to the container.

More Detailed Description of the Currently Disclosed and Currently Claimed Leak-And-Sealing-Failure-Detection Sensor In the following description, a sealed article, regardless of type, whether it is a bag, pouch, pack, bottle, tank, container, package, product, or any other form of closed vessel or fluid containment system, is referred to as a "container." The currently disclosed leak-and-sealing-failure-detection sensor may be more concisely referred to using the term "sensor." The gas or fluid within a container may be referred to as an "indicator," "indicator fluid," or "indicator gas." An indicator gas may be introduced into the container prior to its closure or produced within the container following closure. Leakage of indicator gas from the container is determined by one of various different leak-test procedures or methods. In certain implementations, the leak-test procedure is performed by placing an implementation of the currently disclosed leak-and-sealing-failure-detection sensor in proximity to a container and noting the presence or absence of a signal emitted by the leak-and-sealing-failure-detection sensor as a result of a change in the local environment of a portion of the leak-and-sealing-failure-detection sensor. As discussed above, in certain implementations, the indicator gas has a lower diatomic-oxygen concentration than the air in the general environment, and the presence of the indicator gas in the local environment of a portion of the leak-and-sealing-failure-detection sensor lowers the diatomic-oxygen concentration in the local environment below a threshold concentration resulting in response-signal emission by the leak-and-sealing-failure-detection sensor. This approach senses a change in the diatomic-oxygen concentration in the local environment by a very sensitive leak-and-sealing-failure-detection sensor that responds to the change in the diatomic-oxygen concentration in the local environment. This change in the diatomic-oxygen concentration in the local environment relative to the general environment may be either positive or negative. A negative change increases photoluminescent emission by the reporter molecule, in the above described implementation, while a positive change decreases photoluminescent emission by the reporter molecule.

The currently-disclosed leak-detection method can be applied to containers that contain a variety of different indicator gases or indicator liquids. When a diatomic-oxygen-concentration-difference sensor is employed, the sensor detects the presence of the indicator gas provided that the indicator gas has a lower diatomic-oxygen-concentration than the ambient air and that the indicator gas does not alter or poison the reporter molecule. Thus, the diatomic-oxygen-concentration-difference sensor can be used for different applications in the packaging industry which involve many different indicator gases or liquids and can be used in many different applications in which the sensor is used to detect leaks is a variety of different devices and apparatuses involving gas or fluid delivery systems, tubing and hoses, enclosed plumbing and piped fluid delivery systems, pressurized tires, and other inflated devices and products.

The above-disclosed implementation relies on sensing a diatomic-oxygen-concentration differential. Thus, a change in the ambient diatomic-oxygen concentration in the general environment to which the sensor is exposed can also be detected by the diatomic-oxygen-concentration-difference sensor. As an example, when the general environment has a much lower air pressure that the pressure inside a container, escape of an indicator gas from the container that contains diatomic oxygen at a concentration lower than that in standard pressure air may result in a decreased diatomic-oxygen concentration in the local environment of a portion of the diatomic-oxygen-concentration-difference sensor.

Testing has confirmed that the optical signal emitted by the above-described leak-and-sealing-failure-detection-sensor implementation is extremely sensitive, capable of rapidly identifying tiny changes in $[O_2]$ corresponding to breaches in the integrity of container enclosures. With appropriately designed leak-and-sealing-failure-detection-sensor implementations, the optical signal emitted by the leak-and-sealing-failure-detection sensor in response to container leaks can be identified visually in addition to being detected by optical sensors and imaging devices.

An electro-optical monitoring component can be used to capture spatial digital images of sensor responses to indicator-gas-induced $[O_2]$ changes. Image-based luminescent response data can provide qualitative and quantitative information about the presence of container teaks, including the size, severity, number, and spatial locations of leaks. Two-dimensional and three-dimensional signal-intensity analysis of digitized images of leaking containers can reveal the positions and severities of multiple leaks, which may facilitate determination of the types, natures, and root causes of leaks in containers and inform corrective designs and actions.

A differential in the general environment and environment within a container may result from the common approach utilized in the packaging industry of flushing and purging a container with, for instance, nitrogen or carbon dioxide, in order to displace air from within the container. The purpose of this procedure, often referred to as "modified-atmosphere packaging" ("MAP"), is to reduce or eliminate the oxygen concentration and/or liquid water and water vapor moisture in the container. The MAP procedure may also be used to reduce the concentrations of other gases inside the container that may cause oxidation, corrosion, or other degradation and deterioration of the container's contents over time. In other approaches, chemical scavengers can be included in the container to react with oxygen, water vapor, and other undesired gases and liquids to remove them from the internal environment within the container. Chemical scavengers can be used in addition to nitrogen or carbon-dioxide purges.

In one approach, the currently disclosed leak-and-sealing-failure-detection sensor is directly applied, or placed in close proximity, to the outside of a container to cover any portion, or all, of a container's surfaces to be inspected for leaks. Many implementations of the currently disclosed leak-and-sealing-failure-detection sensor, when placed on, or in close proximity to, a container surface or seal, emit very little fluorescent or phosphorescent light due to quenching by the diatomic-oxygen concentration in ambient air. However, when leakage of the indicator gas within the container occurs, displacing ambient air surrounding a portion of the leak-and-sealing-failure-detection sensor, quenching of reporter-molecule fluorescence or phosphorescence decreases, resulting in increased intensity of light emitted by the sensor portion. The sensor rapidly responds to even miniscule amounts of leaking low-diatomic-oxygen-concentration indicator gases escaping in volumes of microliters or less. The larger the leak and the faster the indicator gas lessens $[O_2]$ in the local environment of the portion of the sensor, the larger the photoluminescent response. A well-designed sensor film having high permeability to the indicator gas responds to gas leakage in fractions of a second. After exposure to the displacing gas, when the sensor is re-exposed to the higher $[O_2]$ in ambient air, the sensor consequently reverts to an oxygen-quenched state. This reversal process is almost instantaneous. The rapidity of the leak-detection process can be fast enough for high-speed inspection of containers on high-volume, high-throughput packaging lines.

Ultraviolet light is a convenient interrogation signal that effectively excites many porphyrin-based molecular reporters to fluoresce and/or phosphoresce. Depending on the porphyrin chosen, excitation wavelengths for stimulating emissions occur in the violet or deep blue (e.g., 350-405 nm), to green, amber, and other regions of the visible-light spectrum. Fluorescent and phosphorescent emissions with wavelengths of around 600 nm, corresponding to red visible light, are common, but there are porphyrin variants known to emit in other regions of the light spectrum. UV light sources are common and widely used as interrogation components, broadcasting illumination over a large surface area. The type of light source can range from fluorescent tubes, to LEDs, lasers, and laser diodes.

In many implementations, the molecular reporter is immobilized in a polymeric film or membrane, which enables conformant placement in close proximity to, or in contact with, the container. Placement of the sensor film or membrane close to the container minimizes the sensing-space between the container and the sensor so that there is little ambient air caught in the gap or voids within that space. Therefore, when indicator gas leaks into the sensing-space, even small volumes of the indicator gas can displace sufficient ambient air to increase fluorescent or phosphorescent light emission by the sensor film. Placement of the sensor film close to the container can be transient, of sufficient duration to perform a leak test, following which the sensor can be removed and repetitively reused to serially test additional containers. A flexible, deformable sensor film enables physical conformation of the film to the surfaces and irregularities of various types of containers.

Figure 7A:
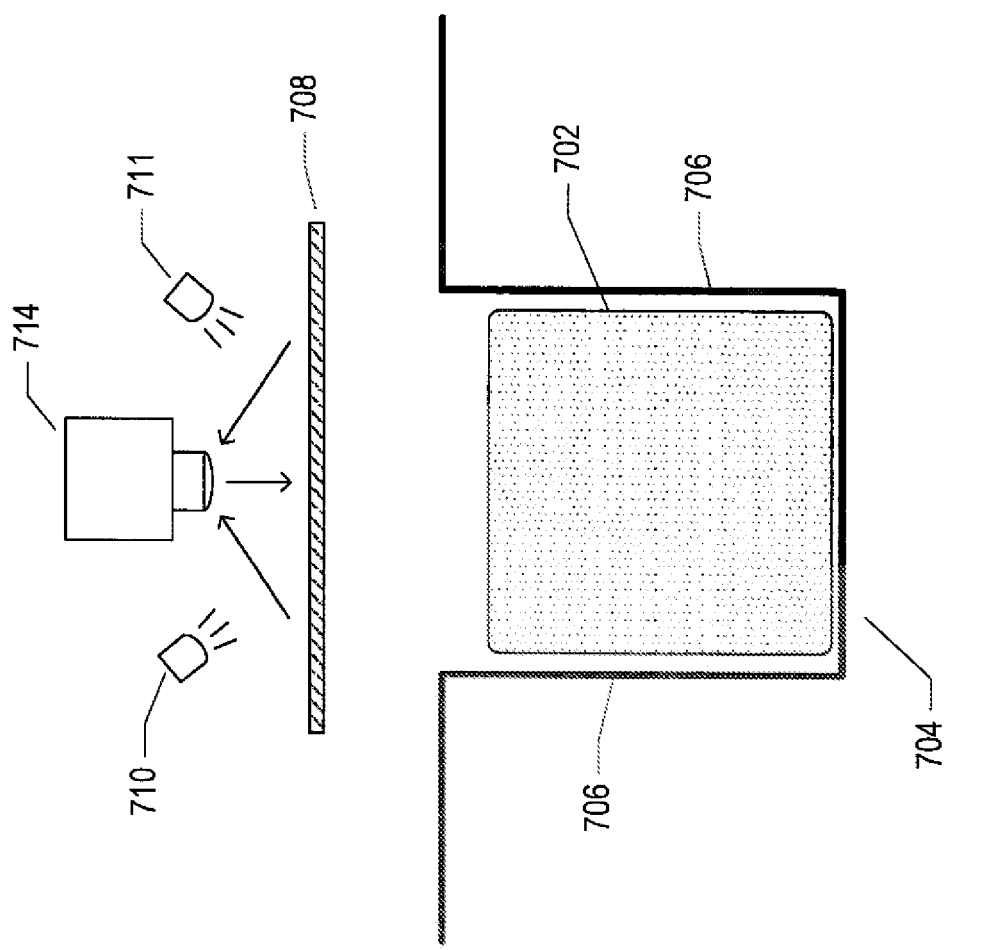
FIGS. 7A-B illustrate one implementation of a leak-detection system that incorporates the currently disclosed leak-and-sealing-failure-detection sensor.
Figure 7B:
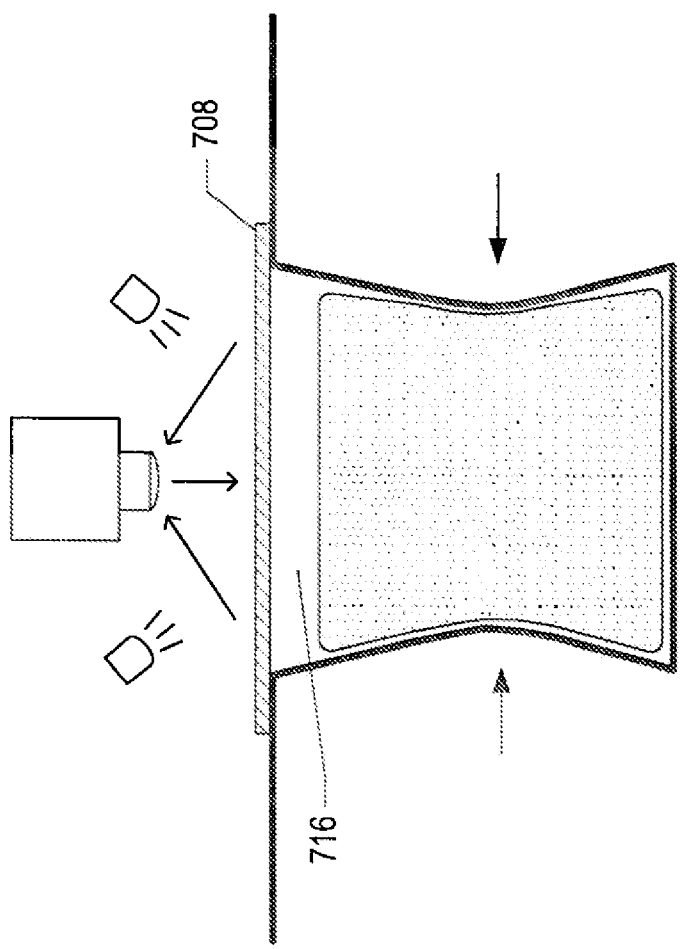

FIGS. 7A-B illustrate one implementation of a leak-detection system that incorporates the currently disclosed leak-and-sealing-failure-detection sensor. FIG. 7A illustrates a side view of a container 702 held within a holder 704. The holder includes a cavity which receives and secures the container. The walls 706 of the cavity are flexible, in the implementation illustrated in FIG. 7A, but may alternatively be rigid or semi-rigid. Leak-and-sealing-failure-detection sensors may, in certain implementations, be incorporated in the cavity walls. A leak-and-sealing-failure-detection sensor-sensor film 708 is shown positioned above the holder. One or more interrogation components 710-711 are positioned to interrogate the leak-and-sealing-failure-detection sensor-sensor film. A camera 714 is positioned to monitor the leak-and-sealing-failure-detection sensor for emission of a response signal.

As shown in FIG. 7B, the leak-and-sealing-failure-detection-sensor film 708 is moved to a position to seal off the cavity in order to create an enclosed environment for detecting the appearance of indicator gas within the cavity. Pressure is applied to the sides of the cavity and/or to the container to deform and compress the container in order to force indicator gas through any leaks and/or sealing failures in the container into the space 716 between the top of the container and the leak-and-sealing-failure-detection sensor-sensor film.

In the illustrated leak-detection-system implementation, the leak-and-sealing-failure-detection-sensor film is prepared by the method shown in FIG. 5. The leak-and-sealing-failure-detection-sensor film exhibits readily observable red luminescence, visible when excited with a 5W 405 nm laser diode. When illuminated with a much lower intensity excitation source, like a UV black-lamp, the emission is barely discernable. When the film is viewed through a red long-pass filter in order to block out background light, a faint red emission under a blacklight can be seen when the sensor film is exposed to air. When the leak-and-sealing-failure-detection-sensor film is exposed to small puffs of $CO_2$ gas, the exposed portions of the leak-and-sealing-failure-detection-sensor film immediately emit readily visible red light. When the $CO_2$ is removed, the leak-and-sealing-failure-detection-sensor film immediately returns to emitting the faint background red luminescence. The difference in intensity between the low-intensity background red luminescence and the relatively high-intensity visible red light emitted upon exposure of the leak-and-sealing-failure-detection-sensor film to the $CO_2$ is significant. The high-intensity visible-red-light response signal has at least twice the intensity of the low-intensity background red luminescence and often much higher intensity relative to the intensity of the low-intensity background red luminescence. This intensity difference is easily perceived by a human monitor. The intensity difference facilitates determining specific locations of leaks and sealing failures. Instrumentation-based monitors, such as digital cameras, also easily detect the positions of leaks and sealing failures, and can do so sufficiently quickly to be amenable for use of the leak-detection method in industrial packaging lines. High-speed image-analysis tools can be used to identify flawed containers and selectively remove them from the packaging line, keeping them from being distributed. Since the signal-intensity differences between the low-intensity background red luminescence and the high-intensity response signals are large, the sensitivity requirements for monitoring components are correspondingly modest.

Instrumentation-based monitoring components can alternatively or additionally detect leakages based on photoluminescent-emission decay, or relaxation time. The above-discussed porphyrin-based reporters have relatively long emission-decay half-lives in local environments with low $[O_2]$, in the microsecond to millisecond range, but much shorter emission-decay half-lives in ambient-air $[O_2]$. The response-signal emission decay times can be measured and quantified and used alone, or in combination with measured signal-intensity differences, to detect leaks and sealing failures.

Immobilization of porphyrin-based reporter molecules partially shields the reporter molecules from exposure to diatomic oxygen, preventing diatomic-oxygen saturation that would render the porphyrin-based reporter molecules non-emissive. This partial shielding is produced by integration of the porphyrin-based reporter molecules within polymer matrices. Different polymers, such as polycarbonate, polypropylene, polystyrenes, and polyolefins, yield markedly different shielding properties. Immobilization of porphyrin-based reporter molecules additionally facilitates minimizing the distances between the porphyrin-based reporter molecules and the surfaces of containers to which the leak-and-sealing-failure-detection sensor is applied. The molecules also need to be immobilized for integration into the form factor of a sensory thin film, so that they can be brought into close proximity to a container in order to sense leaks and sealing failures. Leak-and-sealing-failure-detection-sensor films can be produced by the spray-based method discussed above with reference to FIG. 5, but can also be prepared by various alternative coating methods, casting from solvent/reporter-molecule solutions, and extrusion molding.

Figure 8B:
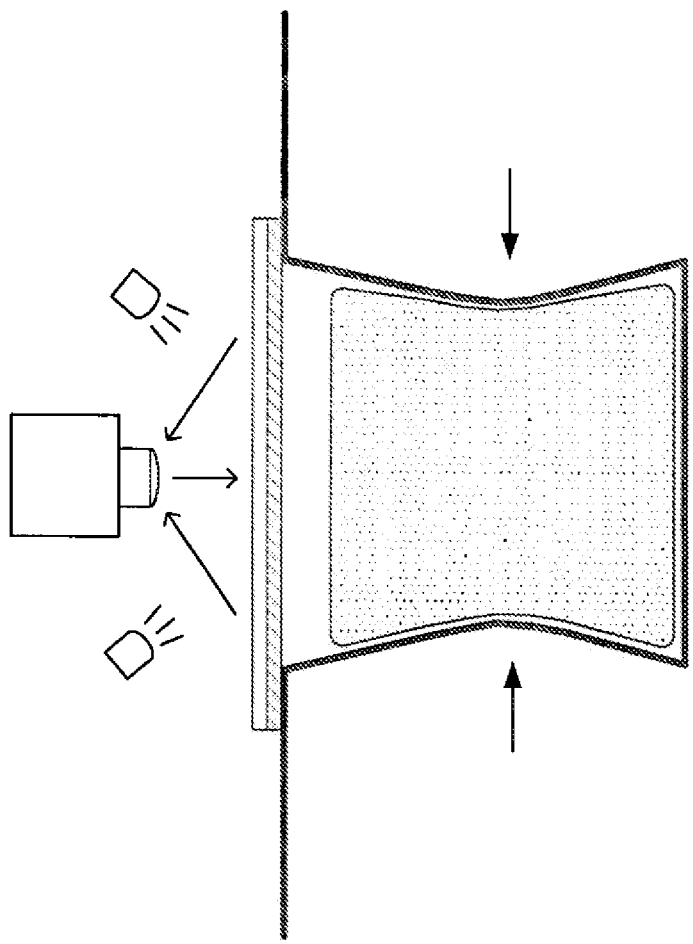

FIGS. 8A-B illustrate a second implementation of the leak-detection system that incorporates an implementation of the currently disclosed leak-and-sealing-failure-detection sensor. FIG. 8A illustrates addition of a transparent oxygen-barrier layer 802 to the leak-and-sealing-failure-detection sensor, which can be rigid or flexible and which is layered on the upper surface of a sensor film, in the implementation shown in FIGS. 8A-B. The cavity walls 804 may additionally include oxygen-barrier properties or an additional oxygen barrier layer may also be incorporated into the walls of the cavity. The transparent oxygen-barrier layer facilitates retention of the indicator gas released through a container leak and limits exposure of the sensor film to ambient air in the external environment, thus increasing both the intensity and the duration of response-signal emission. In certain implementations, a Saran film may serve as the oxygen barrier. Other clear barrier materials that impede $O_2$ migration into the local sensor-film environment can be used, including a clear glass layer or another material that is transparent to the interrogation signal and response signal. FIG. 8B illustrates movement of the leak-and-sealing-failure-detection sensor including the oxygen-barrier layer to a position in which the cavity is sealed, as in FIG. 7B. Different oxygen barriers may have different degrees of permeability to air and diatomic oxygen, which may facilitate tuning the sensitivity and response times of the leak-and-sealing-failure-detection sensors as well as enabling additional features and feature extensions.

Figure 9A:
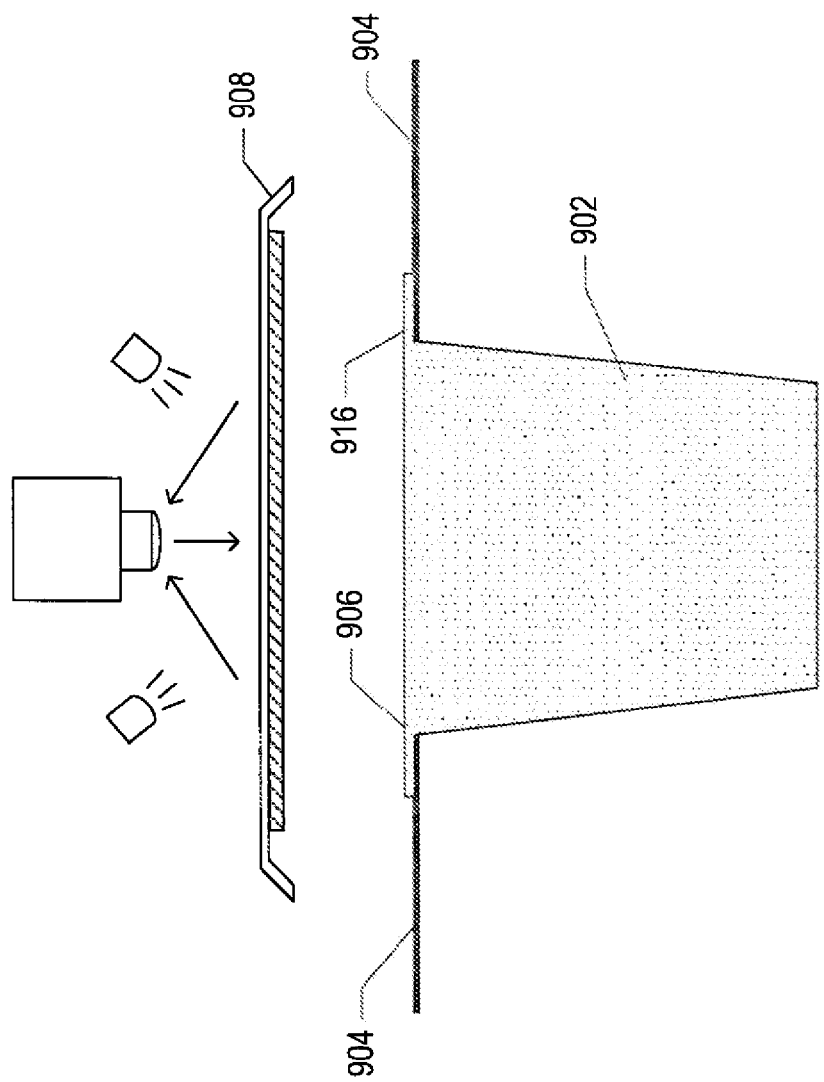
FIGS. 9A-B illustrate a third implementation of a leak-detection system in which the leak-and-sealing-failure-detection sensor incorporates an extended oxygen-barrier.
Figure 9B:
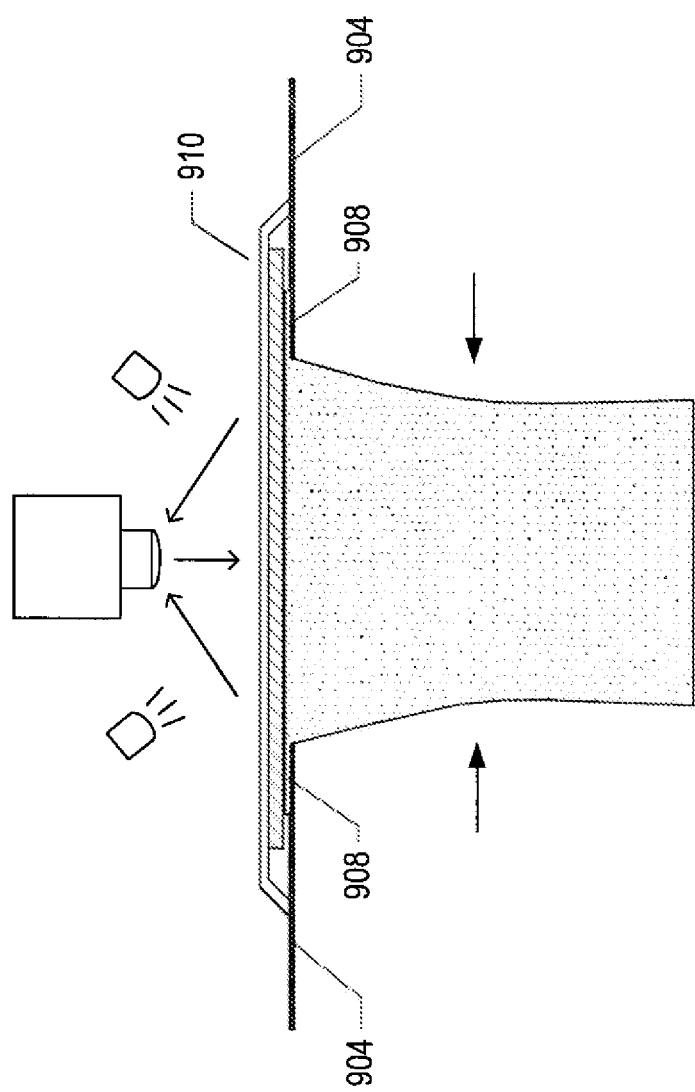

FIGS. 9A-B illustrate a third implementation of a leak-detection system in which the leak-and-sealing-failure-detection sensor incorporates an extended oxygen-barrier. In FIG. 3A, a cup-like container 902 is inserted into an aperture in a holder 904 and the container is sealed with a thin lid 906. An alternative implementation may additionally include a cavity, as in the implementations shown in FIGS. 7A-8B. An oxygen barrier 908 is shown extending beyond the edge of the sensor film, forming a flexible or conformal skirt.

In FIG. 9B, the leak-and-sealing-failure-detection sensor 910 incorporates the extended oxygen-barrier positioned to contact the upper surface of the container lid 908. Pressure generated within the container displaces indicator gas from inside the container via any leaks in the lid and/or the seal between the container and the lid. The flexible skirt, by extending outward past the container edge and conforming to the upper surface of the holder 904 provides an improved seal that isolates the portion of the container, including the lid, that extends above the holder aperture which facilitates sensing displacement gas escaping from leaks in the container.

Figure 10A:
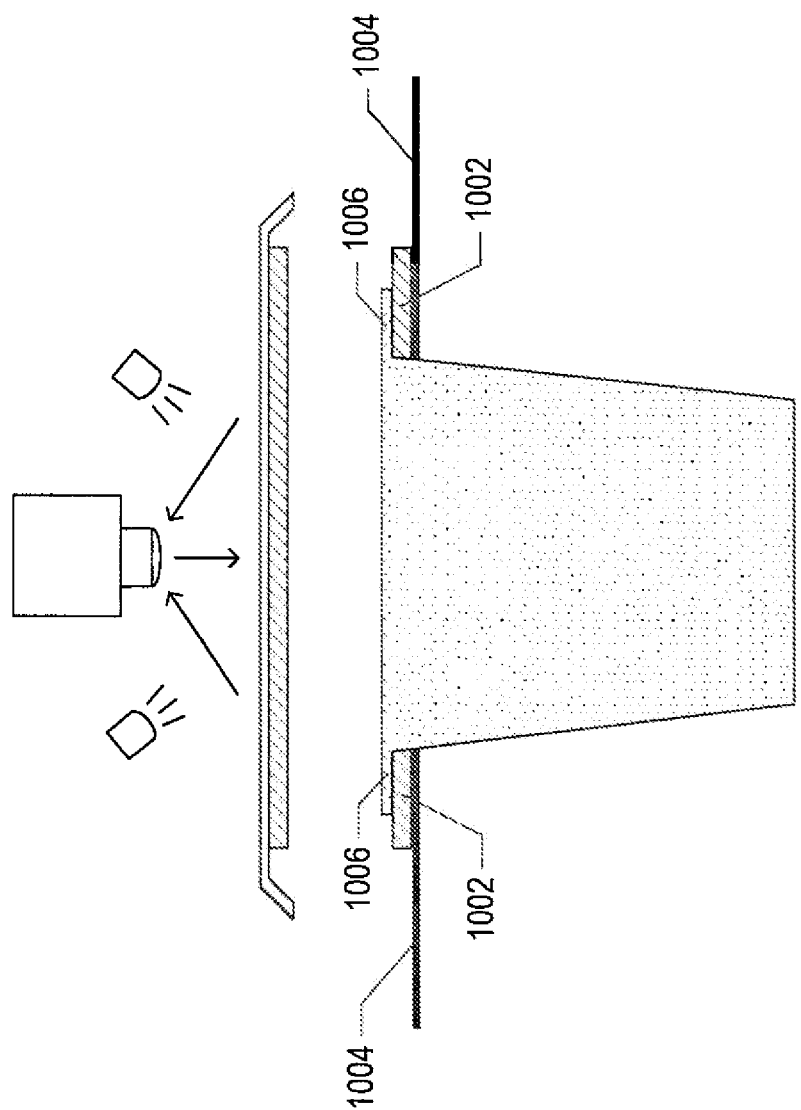
FIGS. 10A-B illustrate a fourth implementation of a leak-detection system in which the leak-detection system includes a sensor-film gasket.
Figure 10B:
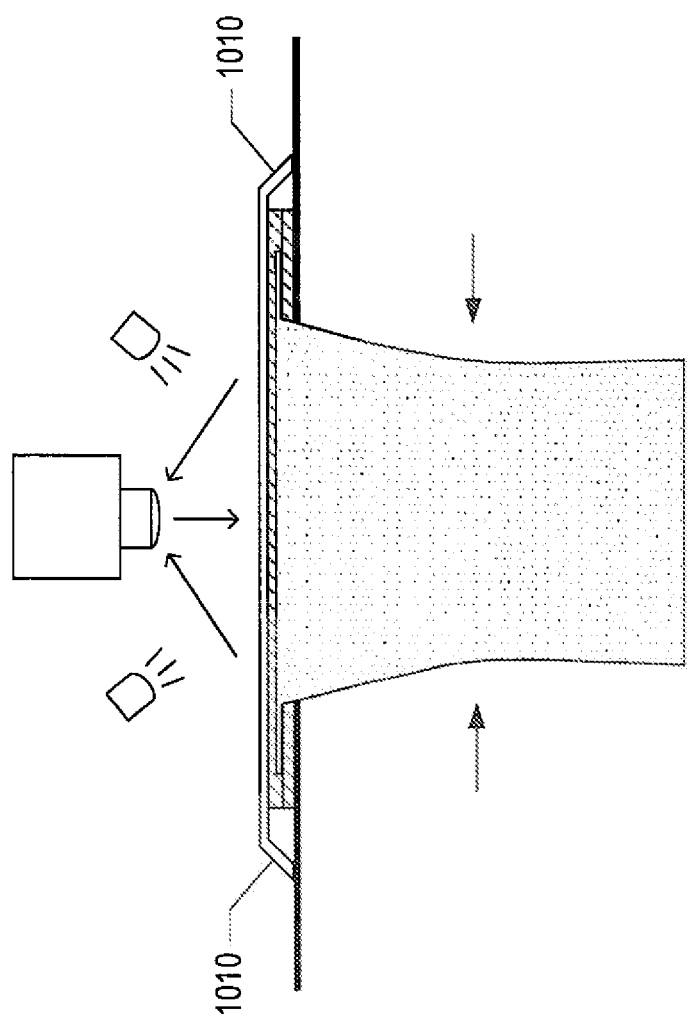

FIGS. 10A-B illustrate a fourth implementation of a leak-detection system in which the leak-detection system includes a sensor-film gasket. FIG. 10A illustrates the sensor-film gasket 1002 on the top surface of the holder 1004, ringing the holder aperture. The portion of the container lid that extends past the container wall 1006 rests on the sensor-film gasket. In an alternative implementation, the sensor-film gasket includes a circular depression into which the container-lid snugly fits. FIG. 10B illustrates the leak-and-sealing-failure-detection sensor positioned in contact with the container lid. The skirt formed by the extended portion of the oxygen barrier 1010 is designed to form a tight conformal seal around the container.

Additional barrier skirts and/or air shields can be included around the periphery of the sensor and/or oxygen-barrier skirt. The container holder fixes the container under test in a certain, known position or orientation relative to the leak-and-sealing-failure-detection sensor that is positioned in juxtaposition with the container. By maintaining the container and leak-and-sealing-failure-detection sensor in fixed, relative positions to one another, the holder facilitates the interrogation and monitoring processes to optimize the leak detection. Certain implementations of the container holder are designed for conformability with the type and shape of the container to be inspected, to minimize the volume of air that gets trapped in the sensing-space between the exterior surface of the container and the leak-and-sealing-failure-detection sensor during testing.

The leakage of displacement gas from the container can occur by passive diffusion, in certain implementations. However, to speed up the leak-detection process, additional components and/or methods are used in alternative implementations to actively expel indicator gas from the container by creating a pressurized environment inside the container. This can be achieved in several ways. An external force can be applied to the outside of a flexible container to distort the container, raising the pressure within the container. A container can be heated to generate increased pressure within a sealed container as, for example, heating a bottle and/or the contents of the bottle. Heating can be achieved by various means, such as radiant heating, microwave heating, contact of the container with thermal transfer devices like a heated container-holder, and using Peltier heating devices.

Another approach to increasing the speed at which the leak-detection process can be carried out is to apply negative-pressure to the outside of a container in order to draw indicator gas out of the container through the leak sites and into the sensing-space. Suction can be applied in a variety of manners to external aspects of all or a portion of the container. Suction can be applied to the air space lying between the container exterior and the leak-and-sealing-failure-detection sensor either directly, though such as a vacuum port or vent, or through the pores and channels in a leak-and-sealing-failure-detection-sensor film.

Figure 11:
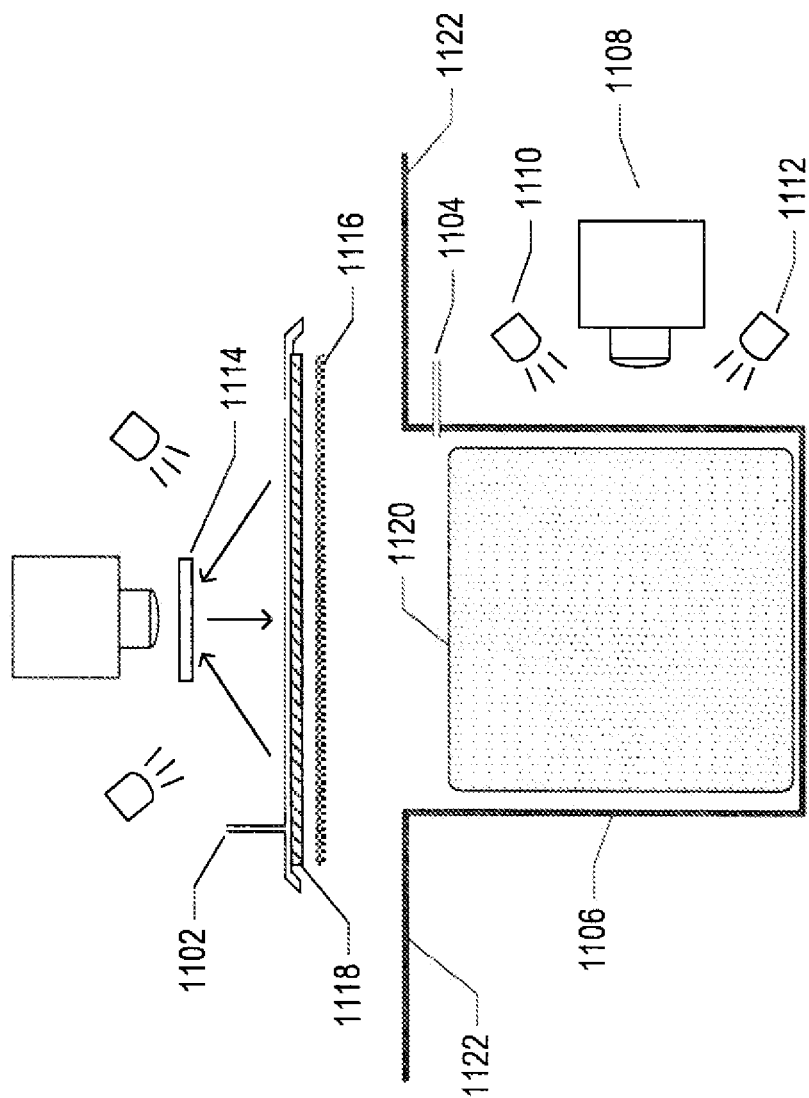
FIG. 11 illustrates additional implementations of the leak-detection system.

FIG. 11 illustrates additional implementations of the leak-detection system. The leak-detection system can include one or more vacuum ports, including a vacuum port 1102 through the oxygen barrier and a vacuum port 1104 through the cavity wall 1106. Negative pressure is created outside the container by a vacuum applied to the one or more vacuum ports, which causes displacement gas to be drawn out of the container through leaks and sealing failures into the sensing space. Additional cameras or photonic devices 1108 and interrogation components 111-1112 can be employed, in various different positions and orientations, to detect leakages from the various surfaces of the container. Additional leak-and-sealing-failure-detection sensors are incorporated into the leak-detection system for interrogation and monitoring by the additional interrogation and monitoring components.

Response-signal detection is enhanced by using red-pass filters interposed between the sensor film and the monitoring components, including human monitors. FIG. 11 illustrates inclusion of an optical filter element 1114 in order to facilitate monitoring of response signals by reducing transmission of reflected light from the interrogation components and/or blocking light with wavelengths different from the response-signal wavelength. A red filter transmits red-wavelength response signals while blocking interference from scattered or reflected UV excitation light, background light, and/or out-of-wavelength fluorescence.

Greater sensitivity, speed of readout, and accuracy of leak detection is obtained using image sensors such as those employed in industrial-manufacturing applications to perform product inspections at high rates of product throughput. Through rapid image acquisition and post-processing image analysis, large amounts of data can be gathered in milliseconds from each image frame to facilitate establishing the presence of a leak, the location of the leak in the image frame, and the location of the leak site on the container. The digital image data can be further used to determine whether the container should be removed from the packaging line by commands sent to assembly-line equipment to cull defective containers from the production line. Cameras with color and fluorescence/luminescence image acquisition capabilities are easily obtained and enable versatile implementations addressing high speed on-production-line reading applications. Multiple cameras may be employed to monitor response signals emitted from different sides of a container. In addition to camera image-based container interrogation, one or more other solid-state photonic sensing devices can be utilized to measure oxygen differences in leak-sensing applications.

Certain implementations of the currently disclosed leak-and-sealing-failure-detection sensor include one or more protective layers that protect the sensor film from damages through contact with containers and/or leak-testing components. One example of a protective layer is a flexible, metal or polymeric, fine-mesh screen with a sufficiently high degree of porosity gas permeability to rapidly transport indicator gas and diatomic-oxygen in order to retain the response time of the leak-and-sealing-failure-detection sensor. FIG. 11 shows an example of a protective layer 1116 interposed between the sensor film 1118 and a container 1120 and/or the container holder 1122. Another example of a protective screen is a fine mesh of a flexible stainless-steel screen, such as a 300 mesh/inch, 0.03" wire diameter, high-optical transmittance screen. Yet another example of a protective layer is a spacer-ring that prevents physical damage to the sensor film by preventing contact of the sensor film with the holder.

A container to be inspected can move on a conveyor belt of a leak-detection system at a high speed. The leak-detection process may involve a brief period of time in which the leak-and-sealing-failure-detection sensor and the container are positioned close together or in contact. In certain implementations of the leak-detection system, the leak-and-sealing-failure-detection sensor and the container move together in a packaging line. To meet industry-standard manufacturing-line requirements for container movement, optical leak-inspection equipment stations retain containers long enough for sufficient volumes of indicator gas to leak from the product and generate a response signal. One approach to ensure sufficient container retention times is to employ moving container-holders and leak-and-sealing-failure-detection sensors, interrogation components, and monitoring components.

Figure 12:
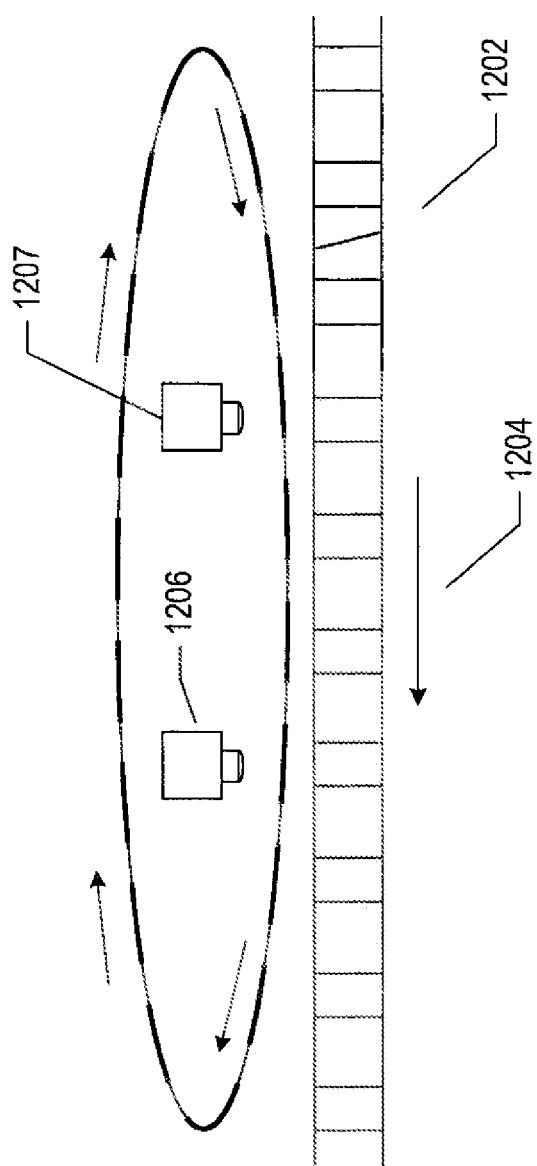
FIG. 12 illustrates an approach for sensing leaks on a production line that includes a continuous stream of containers moving along a conveyor belt.

FIG. 12 illustrates an approach for sensing leaks on a production line that includes a continuous stream of containers 1202 moving along a conveyor belt in the direction of arrow 1204. Each container is positioned in a holder. A series of leak-detection assemblies are linked in a circular moving web. Leak-and-sealing-failure-detection sensors are applied to container holders as interrogation and monitoring components carry out leak detection, moving with the container under test over a distance and corresponding period of time needed for performing leak detection. In certain implementations, one or more cameras 1206-1207, in fixed positions, monitor the leak-and-sealing-failure-detection sensors as they cycle past the cameras. The leak-and-sealing-failure-detection sensors loop back around to repetitively read more containers. Likewise, the container holders similarly recycle to pick up more containers after they release their containers. Containers without leaks or sealing failures continue along the conveyor line while leaking and defective containers are removed.

Figure 13:
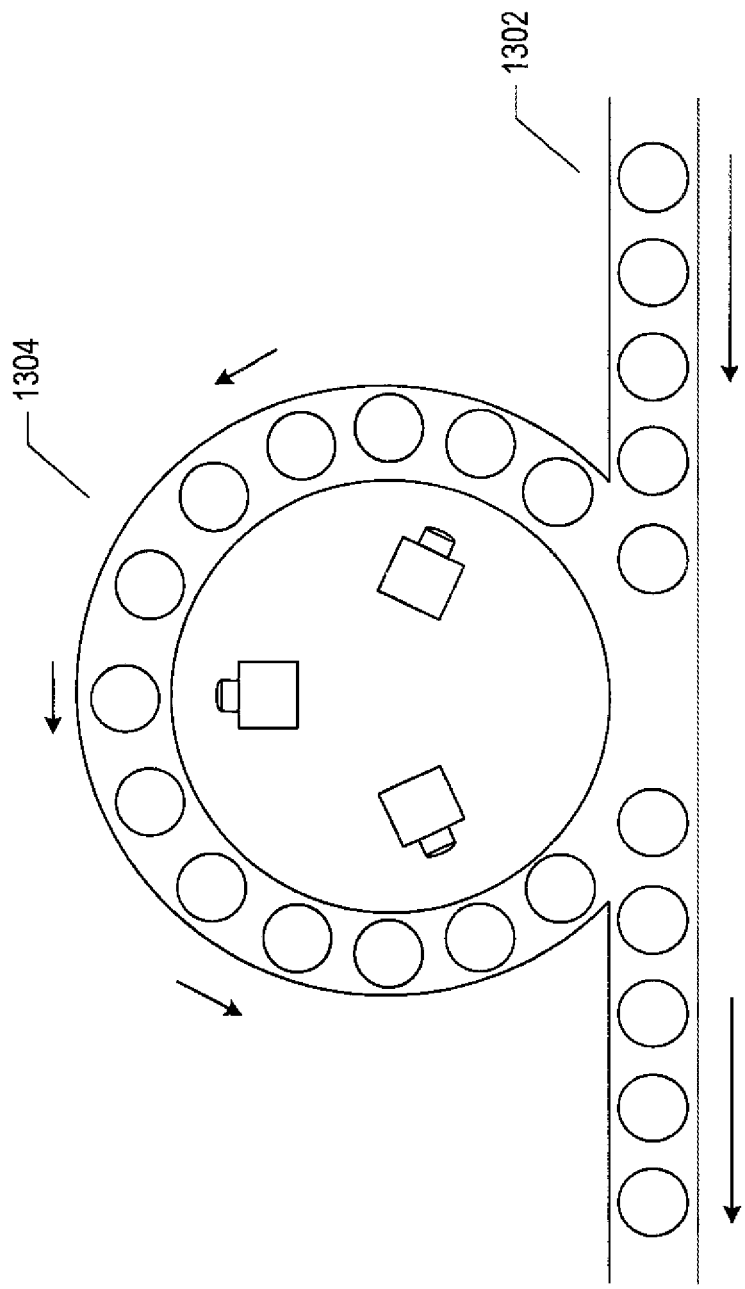
FIG. 13 illustrates another implementation in which containers are shunted from a main conveyor line onto a side loop.

FIG. 13 illustrates another implementation in which containers are shunted from a main conveyor line 1302 onto a side loop 1304. The path distance along the side loop is sufficiently long to provide enough time for leak detection. In many cases, the optical instruments in such approaches can themselves remain stationary, in fixed positions. Multiple cameras can be set up around the loop, each camera monitoring each leak-and-sealing-failure-detection sensor as the containers pass by. Image-analysis subsystems then compile the sequences of response signals gathered over the read-cycle time for each container and, from the multiple-image data sets, determine, for each container, whether or not there is evidence of leakage and/or seal failure. Another approach is to gather one or more moving containers from a conveyor line and interrogate the containers while transiently stationary. Containers may be collected as singles or in batches, using one or multiple container-holders and one or multiple optical instruments to monitor the containers. Then the inspected containers are returned to the conveyor line. A loop could also be used for closer examination of containers that fail an initial low-resolution or low-sensitivity test that serves as a coarse leak test to distinguish intact containers from containers that might possibly have leaks or sealing failures.

Leak-detection subsystems incorporated into manufacturing lines may implement a finishing step in which a brief shot, or continuous stream, of compressed air is directed at the leak-and-sealing-failure-detection sensor following leak-testing of each container. This actively reverses the leak-and-sealing-failure-detection-sensor state at a faster rate than relying on ambient air to passively return to local environments associated with the leak-and-sealing-failure-detection sensor. The air-blast also drives off dust and/or particulates picked up from the packaging operation that might be carried on the container or in the air and ultimately accumulate on the leak-and-sealing-failure-detection sensor.

In certain applications involving vacuum-sealed containers or articles, leakages can be optically identified by incorporating leak-and-sealing-failure-detection sensors within the vacuum-sealed containers. In these applications, the leak-and-sealing-failure-detection sensors exhibit strong luminescent signal responses when the container is sound, with no leaks or seal failures. When, however, there is a leak allowing ingress of diatomic oxygen into the article or container, the signal response diminishes or ceases altogether.

Although the present invention has been described in terms of particular embodiments, it is not intended that the invention be limited to these embodiments. Modifications within the spirit of the invention will be apparent to those skilled in the art. For example, the currently disclosed leak-and-sealing-failure-detection sensors may include a variety of different types of reporter molecules and other sensing components for sensing a variety of different types of differences between a general environment and one or more sensor-associated local environments. Leak-and-sealing-failure-detection sensors can be manufactured in many different shapes and sizes with a variety of different sensitivities and sensing characteristics. Leak-and-sealing-failure-detection sensors may additionally include reference-signal features and/or signal-calibration features. Leak-and-sealing-failure-detection sensors may additionally include fiducials and markings to facilitate image acquisition and image analysis.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A leak-and-sealing-failure-detection sensor contained within a global gaseous or liquid environment having one or more chemical components, the leak-and-sealing-failure-detection sensor comprising:
   an interrogation component that emits an interrogation signal;
   a monitoring component that outputs an indication of a leak or sealing failure when the monitoring component detects a response signal; and
   a sensor substrate impregnated with reporter molecules that
      receives the interrogation signal, and
      when the concentration of at least one of the chemical components in a local environment containing a portion of the sensor substrate differs from the concentration of the chemical component in the global environment, the portion of the sensor substrate emits a response signal to the monitoring component.

2. The leak-and-sealing-failure-detection sensor of claim 1 wherein the interrogation signal is light with a first wavelength range that, when absorbed by a reporter molecule, results in transition of the reporter molecule from a ground state to an excited state.

3. The leak-and-sealing-failure-detection sensor of claim 2 wherein the response signal is light emitted when a reporter molecule in the excited state relaxes back to the ground state by fluorescent or phosphorescent emission of a photon with an energy corresponding to light of a second wavelength range different from the first wavelength range.

4. The leak-and-sealing-failure-detection sensor of claim 3 wherein a chemical component of the global environment can, upon colliding with a reporter molecule, cause a non-radiative transition of a reporter molecule in the excited state back to the ground state, referred to as "quenching".

5. The leak-and-sealing-failure-detection sensor of claim 1
   wherein, when the portion of the sensor substrate is illuminated by light having a first wavelength range less than a first threshold wavelength and an illumination intensity and when the concentration of the at least one of the chemical components in the local environment containing the portion of the sensor substrate is equal to the concentration of the at least one of the chemical components in the global environment, the portion of the sensor substrate emits light having a second wavelength longer than any wavelength in the first wavelength range with a first intensity proportional to the illumination intensity and wherein emission of the light having the second wavelength is associated with a first emission-decay half-life; and
   wherein, when the portion of the sensor substrate is illuminated by light having the first wavelength range and the illumination intensity and when the concentration of the at least one of the chemical components in the local environment containing the portion of the sensor substrate is less than the concentration of the at least one of the chemical components in the global environment, the portion of the sensor substrate emits light having the second wavelength with a second intensity greater than the first intensity and wherein emission of the light having the second wavelength is associated with a second emission-decay half-life greater than the first emission-decay half-life.

6. The leak-and-sealing-failure-detection sensor of claim 5 wherein the response signal is light emitted by the portion of the sensor substrate having the second wavelength with an intensity greater than or equal to the second intensity.

7. The leak-and-sealing-failure-detection sensor of claim 6 wherein the response signal is associated with an emission-decay half-life greater than or equal to the second emission-decay half-life.

8. The leak-and-sealing-failure-detection sensor of claim 1
   wherein, when the portion of the sensor substrate is illuminated by light having a first wavelength range less than a first threshold wavelength and an illumination intensity and when the concentration of the at least one of the chemical components in the local environment containing the portion of the sensor substrate is equal to the concentration of the at least one of the chemical components in the global environment, the portion of the sensor substrate emits light having a second wavelength longer than any wavelength in the first wavelength range with a first intensity proportional to the illumination intensity and wherein emission of the light having the second wavelength is associated with a first emission-decay half-life; and
   wherein, when the portion of the sensor substrate is illuminated by light having the first wavelength range and the illumination intensity and when the concentration of the at least one of the chemical components in the local environment containing the portion of the sensor substrate is greater than the concentration of the at least one of the chemical components in the global environment, the portion of the sensor substrate emits light having the second wavelength with a second intensity less than the first intensity and wherein emission of the light having the second wavelength is associated with a second emission-decay half-life less than the first emission-decay half-life.

9. The leak-and-sealing-failure-detection sensor of claim 8 wherein the response signal is light emitted by the portion of the sensor substrate having the second wavelength with an intensity less than or equal to the second intensity.

10. The leak-and-sealing-failure-detection sensor of claim 9 wherein the response signal is associated with an emission-decay half-life less than or equal to the second emission-decay half-life.

11. The leak-and-sealing-failure-detection sensor of claim 1 wherein the concentration of the at least one of the chemical components in the local environment containing the portion of the sensor substrate differs from the concentration of the chemical component in the global environment as a result of displacing, by the contents of a container, package, or product to which the leak-and-sealing-failure-detection sensor is applied, all or a portion of the gaseous or liquid contents of the local environment.

12. The leak-and-sealing-failure-detection sensor of claim 1
   wherein the interrogation component is a blue or UV light source;
   wherein the monitoring component comprises
      an imaging apparatus that detects and images red light, and an image-analysis components that analyzes images to detect leaks and sealing failures in objects to which the leak-and-sealing-failure-detection sensor is applied, wherein the response signal consists of red light having an intensity different from a background intensity and an emission-decay half-life different from a background emission-decay half-life.

13. The leak-and-sealing-failure-detection sensor of claim 12 wherein the sensor substrate comprises polyvinylidene fluoride ("PVDF") polymer.

14. The leak-and-sealing-failure-detection sensor of claim 13 wherein the reporter molecule is one of:
Pd(II) meso-tetra(pentafluorophenyl) porphine; and
Pd(II) octaethylporphine.

15. The leak-and-sealing-failure-detection sensor of claim 14 wherein the at least one chemical component is diatomic oxygen.

16. The leak-and-sealing-failure-detection sensor of claim 14 wherein the sensor substrate is impregnated with reporter molecules by applying a methanol solution of the reporter molecules to a PVDF film or membrane.

17. The leak-and-sealing-failure-detection sensor of claim 1 further comprising one or more light filters that filter the response signal prior to input of the response signal to the monitoring component.

18. The leak-and-sealing-failure-detection sensor of claim 1 further comprising one or more chemical barriers.

19. The leak-and-sealing-failure-detection sensor of claim 1 further comprising one or more protective layers to protect the sensor substrate from damage.

20. The leak-and-sealing-failure-detection sensor of claim 1 incorporated into a leak-detection system that further includes mechanical components that temporarily immobilize a container, package, or product and apply the leak-and-sealing-failure-detection sensor to the immobilized container, package, or product to detect leaks and/or sealing failures.

* * * * *